US011656583B2

(12) United States Patent
Hwang

(10) Patent No.: US 11,656,583 B2
(45) Date of Patent: May 23, 2023

(54) ELECTRONIC APPARATUS AND METHOD FOR CONTROLLING THE SAME

(71) Applicant: Samsung Electronics Co., Ltd., Suwon-si (KR)

(72) Inventor: Sangyoung Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 809 days.

(21) Appl. No.: 16/596,064

(22) Filed: Oct. 8, 2019

(65) Prior Publication Data

US 2020/0117148 A1  Apr. 16, 2020

(30) Foreign Application Priority Data

Oct. 10, 2018 (KR) ........................ 10-2018-0120727

(51) Int. Cl.
*G06F 3/06* (2006.01)
*G06F 11/10* (2006.01)
(Continued)

(52) U.S. Cl.
CPC ........... *G05B 9/02* (2013.01); *B60W 50/0205* (2013.01); *G05B 13/027* (2013.01); *G05B 19/0425* (2013.01); *G05B 19/0428* (2013.01); *G06F 11/0751* (2013.01); *G06F 11/0796* (2013.01); *B60W 2050/021* (2013.01);
(Continued)

(58) Field of Classification Search
CPC ..... G06T 15/005; G06T 1/20; G06F 11/2236; G06F 11/073; G06F 11/277; G06F 11/2205; G06F 11/0751; G06F 11/0796;
G01R 31/3187; G01R 31/317; G05B 9/02; G05B 13/027; G05B 19/0425; G05B 19/0428; B60W 50/0205
See application file for complete search history.

(56) References Cited

U.S. PATENT DOCUMENTS 5,107,425 A    4/1992 Donges et al.
7,454,281 B2   11/2008 Hori
(Continued)

FOREIGN PATENT DOCUMENTS

EP  3 220 220 A1   9/2017
JP     5313396 B2   10/2013
(Continued)

OTHER PUBLICATIONS

Shaheen et al., Advanced ECC solution for automotive SoCs, 3 pages (Year: 2017).*
(Continued)

*Primary Examiner* — Thuy Dao
(74) *Attorney, Agent, or Firm* — Jefferson IP Law, LLP

(57) ABSTRACT

An artificial intelligence (AI) system using a machine learning algorithm and an application thereof is provided. The method for controlling an electronic apparatus includes acquiring an output value by inputting an input value to a function module to perform a function corresponding to the function module included in the electronic apparatus, identifying a safety mechanism to be applied to the function module based on the input value and the output value, and detecting an error operation of the function module based on the identified safety mechanism.

20 Claims, 16 Drawing Sheets

(51) Int. Cl.
  *G06F 9/455* (2018.01)
  *G06F 9/445* (2018.01)
  *G05B 9/02* (2006.01)
  *G05B 13/02* (2006.01)
  *G06F 11/07* (2006.01)
  *G05B 19/042* (2006.01)
  *B60W 50/02* (2012.01)

(52) U.S. Cl.
  CPC .............. *G05B 2219/14012* (2013.01); *G05B 2219/24008* (2013.01); *G06F 2201/86* (2013.01)

(56) References Cited

U.S. PATENT DOCUMENTS

| | | |
|---|---|---|
| 8,396,588 B2 | 3/2013 | Senger et al. |
| 8,803,654 B2 | 8/2014 | Kurachi et al. |
| 8,943,478 B2 | 1/2015 | Artzi et al. |
| 9,043,674 B2 | 5/2015 | Wu et al. |
| 2005/0113942 A1 | 5/2005 | Longsdorf et al. |
| 2012/0283870 A1 | 11/2012 | Senger et al. |
| 2012/0297101 A1 | 11/2012 | Neupaertl et al. |
| 2012/0330501 A1 | 12/2012 | Sundaram et al. |
| 2014/0067192 A1 | 3/2014 | Yousuf |
| 2017/0169627 A1 | 6/2017 | Kim et al. |
| 2017/0217419 A1 | 8/2017 | Ten et al. |
| 2017/0286680 A1 | 10/2017 | Benoit et al. |
| 2018/0169864 A1 | 6/2018 | Haddadin |
| 2019/0166035 A1* | 5/2019 | Nallavalli ............... H04L 43/50 |
| 2019/0171538 A1* | 6/2019 | Gulati ................. G06F 11/2205 |
| 2019/0243566 A1* | 8/2019 | Hassan ................. G06F 3/0604 |

FOREIGN PATENT DOCUMENTS

| | | |
|---|---|---|
| KR | 10-1295770 B1 | 8/2013 |
| WO | 2016/184451 A1 | 11/2016 |

OTHER PUBLICATIONS

Wikipedia, Self-modifying code, https://en.wikipedia.org/wiki/Self-modifying_code, Apr. 27, 2003.

European Examination Report dated Apr. 9, 2021, issued in European Patent Application No. 19 202 242.4.

International Search Report dated Jan. 20, 2020, issue in International Patent Application No. PCT/KR2019/013185.

European Search Report dated Feb. 25, 2020, issued in European Patent Application No. 19202242.4.

European Communication under Rule 71(3) EPC dated Oct. 10, 2022, issued in European Patent Application No. 19202242.4-1205.

* cited by examiner

FIG. 5

| FUNCTION | FAILURE STATE | SAFETY INTEGRITY LEVEL |
|---|---|---|
| Smart Rear View Camera System | No valid video sensor data | ASIL B |
| Brake Lights | Loss of Brake Lights | ASIL B |
| Rear Lights | Failure on both sides | ASIL A |
| Airbag System | Unintended Deployment | ASIL D |
| Electric power steering | Self-steering | ASIL D |
| Braking and Stability Systems | Unintended full power brake | ASIL D |
| Driving Lights | Failure on both sides | ASIL B |
| Engine Management | Unwanted vehicle acceleration | ASIL C to D |
| 77GHz RADAR ACC | Inadvertent Braking | ASIL C |
| Active Suspension | Suspension oscillates | ASIL B to C |
| Instrument Cluster | Speedometer not available | ASIL B |
| Front View Camera System | No valid video sensor data | ASIL B |

FIG. 6

| Safety Mechanisms | | ASIL | | | |
|---|---|---|---|---|---|
| | | A | B | C | D |
| 1a | Range checks of input and output data | ++ | ++ | ++ | ++ |
| 1b | Plausibility check[a] | + | + | + | ++ |
| 1c | Detection of data errors[b] | + | + | + | + |
| 1d | External monitoring facility[c] | 0 | + | + | ++ |
| 1e | Control flow monitoring | 0 | + | ++ | ++ |
| 1f | Diverse software design | 0 | 0 | + | ++ |

ELECTRONIC APPARATUS AND METHOD FOR CONTROLLING THE SAME

CROSS-REFERENCE TO RELATED APPLICATION(S)

This application is based on and claims priority under 35 U.S.C § 119(a) of a Korean patent application number 10-2018-0120727, filed on Oct. 10, 2018, in the Korean Intellectual Property Office, the disclosure of which is incorporated by reference herein in its entirety.

BACKGROUND

1. Field

The disclosure relates to an electronic apparatus and a method for controlling the same. More particularly, the disclosure relates to an electronic apparatus and a method for controlling the same for detecting an error of the electronic apparatus using an additional safety mechanism.

2. Description of Related Art

A safety integrity level (SIL) refers to a safety level of electronic apparatuses such as automobiles, facilities installed at sites, and robots for safety. In detail, the safety integrity level may mean a statistical criterion for ensuring functional safety whether the electronic apparatus operates as intended. In particular, the safety integrity level is specified as an automotive safety integrity level (ASIL) in the automobile industry.

In each field, safety integrity levels are assessed for electronic apparatuses according to various standards. These safety integrity levels are identified based on analysis of risk sources and risk assessment for each safety function of electronic apparatuses.

Specifically, the safety integrity level assigns a low level to safety functions which slightly damages electronic apparatuses when an error occurs in the safety functions of the electronic apparatuses and have a low probability of failure, and assigns a high level to safety functions which are difficult to implement or are expected to cause loss of lives.

Methods of safety mechanism for detecting whether an error occurs in a safety function and identifying how to handle the error according to the current level of safety functions are specified in standards.

Accordingly, the minimum safety mechanism proposed by the levels of the function should be applied. As the minimum safety mechanism, the safety mechanism of each function level is recommended so as to detect whether an error occurs in the safety functions according to the level of the safety function. In general, the safety integrity of the safety function is detected using only the recommended safety mechanism.

Meanwhile, as an automation area is expanded with the development of technology, external environment recognition and function control based thereon are being implemented by a system of an electronic apparatus.

In detail, the surrounding environment is recognized by a sensor or an external sensor included in the electronic apparatus, the surrounding situation or the state of the electronic apparatus itself is identified based on the recognized result value, and an operation is performed based on the identified result. For example, each function (e.g., recognition, identification, control, and the like) module of the current electronic apparatus checks whether the safety functions of each function module are operating properly based on the safety mechanism applied according to the safety level when performing the function.

Meanwhile, as technology advances, the electronic apparatus system is developing into an artificial intelligence system that implements human-level intelligence from the existing electronic apparatus system which operates only according to a configured program. The artificial intelligence system is a system in which a machine learns and identifies on its own and has an improved recognition rate as the machine is used.

The artificial intelligence technology includes machine learning (deep learning) technologies that use algorithms to classify/learn characteristics of input data, element technologies that simulate functions of recognition, identification, and the like, of a human brain using machine learning algorithms, and the like.

Examples of the element technologies include at least one of a linguistic understanding technology for recognizing human language/character, a visual understanding technology for recognizing objects like human vision, a reasoning/prediction technology for logically reasoning and predicting information by identifying the information, a knowledge expression technology processing human experience information with knowledge data, or a motion control technology controlling autonomous driving of vehicles and movement of robots.

The disclosure provides a method for detecting an error or problem or detecting the error or problem more quickly by using artificial intelligence under circumstances where a detection of an error or problem of an electronic apparatus fails or is delayed only by a safety mechanism that is already applied according to a level of a safety function as an electronic apparatus system trains and process data on its own.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus applying an additional safety mechanism other than a safety mechanism according to a safety integrity level of a function module, and a method for controlling the same.

Additional aspects will be set forth in part in the description which follows and, in part, will be apparent from the description, or may be learned by practice of the presented embodiments.

In accordance with an aspect of the disclosure, a method for controlling an electronic apparatus is provided. The method includes acquiring an output value by inputting an input value to a function module to perform a function corresponding to the function module included in the electronic apparatus, identifying a safety mechanism to be applied to the function module based on the input value and the output value, and detecting an error operation of the function module based on the identified safety mechanism.

In the identifying, when the input value and the output value are within a normal range based on a previously applied safety mechanism according to a safety integrity level of the function module, and the input value and the output value satisfy a preset condition, an additional safety mechanism other than the previously applied safety mechanism may be identified.

The condition may be at least one of a case where the number of times of input of the input value and the number of times of output of the output value are different, a case where the output value to the input value has a tendency to be close to a boundary of the normal range, or a case where an amount of change in the output value to the input value exceeds a preset value.

The method may further include training the identified additional safety mechanism with a safety mechanism for the input value and the output value.

In the identifying, when the input value and the output value are within a normal range based on a previously applied safety mechanism according to a safety integrity level of the function module, and the input value and the output value does not satisfy a preset condition, an application of a previously safety mechanism to the function module may be stopped.

The input value may be at least one of a value acquired by a sensor, a value received from an external device, and an output value of a previous function module.

The method may further include transitioning the electronic apparatus to a safe state based on an error operation of the function module detected.

The function module may be one of a recognition module, an identification module, and a control module. The function module may be a software component that configures software applied to a vehicle. The function module may be hardware and software as elements constituting at least one or more systems applied to a vehicle. The function module may be a module that monitors or manages a sensor value received or measured from each hardware for monitoring or managing sensor values received or measured from the respective hardware corresponding to at least one hardware for combinations of hardware devices for configuring at least one function of a vehicle.

In accordance with another aspect of the disclosure, an electronic apparatus is provided. The apparatus includes a memory configured to include at least one command, and a processor configured to control the electronic apparatus by executing the at least one instruction stored in the memory, in which the processor acquires an output value by inputting an input value to a function module to perform a function corresponding to the function module included in the electronic apparatus, identifies a safety mechanism to be applied to the function module based on the input value and the output value, and detects an error operation of the function module based on the identified safety mechanism.

The processor may identify an additional safety mechanism other than the previously applied safety mechanism when the input value and the output value are within a normal range based on a previously applied safety mechanism according to a safety integrity level of the function module, and the input value and the output value satisfy a preset condition.

The condition may be at least one of a case where the number of times of input of the input value and the number of times of output of the output value are different, a case where the output value to the input value has a tendency to be close to a boundary of the normal range, or a case where an amount of change in the output value to the input value exceeds a preset value.

The processor may train the identified additional safety mechanism with a safety mechanism for the input value and the output value.

The processor may stop an application of a previously safety mechanism to the function module when the input value and the output value are within a normal range based on a previously applied safety mechanism according to a safety integrity level of the function module, and the input value and the output value does not satisfy a preset condition.

The input value may be at least one of a value acquired by a sensor, a value received from an external device, or an output value of a previous function module.

The processor may transition the electronic apparatus to a safe state when an error operation of the function module is detected.

The function module may be one of a recognition module, an identification module, and a control module. The function module may be a software component that configures software applied to a vehicle. The function module may be hardware and software as elements constituting at least one or more systems applied to a vehicle. The function module may be a module that monitors or manages a sensor value received or measured from each hardware for monitoring or managing sensor values received or measured from the respective hardware corresponding to at least one hardware for combinations of hardware devices for configuring at least one function of a vehicle.

In accordance with another aspect of the disclosure, a computer-readable recording medium is provided. The computer-readable recording medium includes a program for executing a method for controlling an electronic apparatus, in which a method for controlling an electronic apparatus includes acquiring an output value by inputting an input value to a function module to perform a function corresponding to the function module included in the electronic apparatus, identifying a safety mechanism to be applied to the function module based on the input value and the output value, and detecting an error operation of the function module based on the identified safety mechanism.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram illustrating a safety integrity level for each safety function of a vehicle according to an embodiment of the disclosure;

FIG. 6 is a diagram illustrating a safety mechanism applied to each safety integrity level according to an embodiment of the disclosure;

Throughout the drawings, like reference numerals will be understood to refer to like parts, components, and structures.

DETAILED DESCRIPTION

Figure 1:
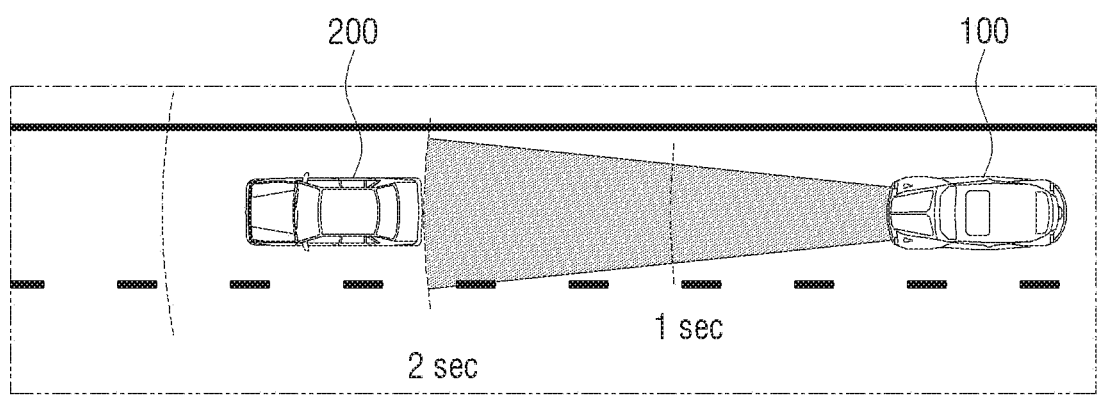
FIG. 1 is a diagram illustrating an error detection situation of an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The disclosure may be variously modified and have several embodiments, and therefore specific embodiments of the disclosure will be illustrated in the drawings and be described in detail in the detailed description. However, it is to be understood that the disclosure is not limited to specific embodiments, but includes all modifications, equivalents, and substitutions without departing from the scope and spirit of the disclosure. When it is identified that a detailed description of the known art related to the disclosure may obscure the gist of the disclosure, the detailed description will be omitted.

Terms 'first', 'second', and the like, may be used to describe various components, but the components are not to be construed as being limited by these terms. The terms are used only to distinguish one component from another component.

Singular forms are intended to include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In embodiments, a 'module' or a '~er/or' may perform at least one function or operation, and be implemented by hardware or software or be implemented by a combination of hardware and software. In addition, a plurality of 'modules' or a plurality of '~ers/ors' may be integrated in at least one module and be implemented by at least one processor except for a 'module' or an '~er/or' that needs to be implemented by specific hardware.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to embodiments described herein. In addition, in the drawings, portions unrelated to the description will be omitted to obviously describe the disclosure, and similar reference numerals will be used to describe similar portions throughout the specification.

Hereinafter, embodiments of the disclosure will be described in detail with reference to the accompanying drawings.

FIG. 1 is a diagram for illustrating an error detection situation of an electronic apparatus according to an embodiment of the disclosure.

Referring to FIG. 1, FIG. 1 is a diagram illustrating an embodiment of the disclosure applied to an advanced driver assistance system (ADAS) of a vehicle when an electronic apparatus 100 is a vehicle. In this case, a vehicle may be a general vehicle driven by a user, or may be an autonomous driving vehicle.

The ADAS is a technology for a vehicle itself to recognize some of various situations that can occur while driving, identify the situations, and control a machine apparatus. The ADAS includes autonomous emergency braking (AEB) that causes a vehicle to slow or stop on its own without a driver to step on a brake in the event of a collision risk, a lane keep assist system (LAKS) that keeps lanes by adjusting a driving direction in the event of lane departure, advanced smart cruise control (ASCC) that causes a vehicle to travel at a preset speed and keep a distance from a forward vehicle on its own, active blind spot detection (ABSD) that helps a vehicle to change a lane safely by detecting a collision at a blind spot, an around view monitor (AVM) that visually shows situations around a vehicle, and the like. Safety integrity levels for various safety functions associated with a vehicle will be described below with reference to FIG. 5.

An error detection operation of the ASCC system of the electronic apparatus 100 according to an embodiment of the disclosure will be described with reference to FIG. 1. The electronic apparatus 100 may include various function modules, and the system may be implemented by a combination of various function modules. The function module may be a software component that configures software applied to the vehicle. The function module may be hardware and software as elements constituting at least one or more systems applied to a vehicle. The function module may be a module that monitors or manages a sensor value received or measured from each hardware corresponding to at least one hardware for combinations of hardware devices for configuring at least one function of a vehicle.

Meanwhile, in the specification, for convenience of description, each function module is illustrated and described as having a separate configuration, but may be implemented in one chip, such as a processor, in actual implementation.

In an embodiment, the recognition module may receive an image of an object 200 and a distance value between the electronic apparatus 100 and the object 200 by a sensor, such as a camera or a radar. In this case, an identification module may identify a speed control value based on the input value, and a control module may control the electronic apparatus 100 to be accelerated or decelerated based on the identified speed control value. The safety mechanism corresponding to ASIL B can be applied and executed to each function module, such as the recognition module, the identification module, and the control module. The safety mechanism includes an object of preventing an error or a potential error, and is for notifying a driver of information on a failure or transitioning a vehicle to a safe state, and the type, target, method, and the like, of the safety mechanism are already established.

In detail, the electronic apparatus 100 may receive an image including the object 200, and may output a result of recognizing that the object 200 included in the image is a vehicle and an accuracy of the result. In this case, the electronic apparatus 100 may apply an input value and an output value to the safety mechanism to detect whether an error occurs in the safety function.

For example, the safety mechanism applied to the ASIL B may perform a range check of input/output data. Specifically, in the safety mechanism applied to the ASIL B, if it may be identified that the range of accuracy of the object recognition result is 50% or more and the range is normal, and if the output accuracy is 55%, it may be identified that the accuracy is normal.

However, when the output accuracy falls from 85% to 55%, the electronic apparatus 100 according to the disclosure may consider that the output value is within a normal range, but there is a problem in the recognition process, and therefore may apply an additional safety mechanism. For example, the electronic apparatus 100 may identify whether the object 200 of the image is a vehicle by applying an input value and an output value to a diverse software design which is an additional safety mechanism. In this case, the additionally applied mechanism may be specified by a user, a manufacturer, or the like, or may be trained to be applied in a similar situation as before.

As described above, the object 200 is recognized by applying various algorithms, so that an error that cannot be detected by the safety mechanism, according to the existing safety integrity level, can be detected.

The error detection operation of the function module as described above will be described in more detail with reference to FIGS. 7 to 10.

Meanwhile, in FIG. 1, the electronic apparatus 100 is described as being a vehicle, but according to an embodiment, the electronic apparatus 100 may be implemented as a robot, a factory facility, or the like.

Figure 2:
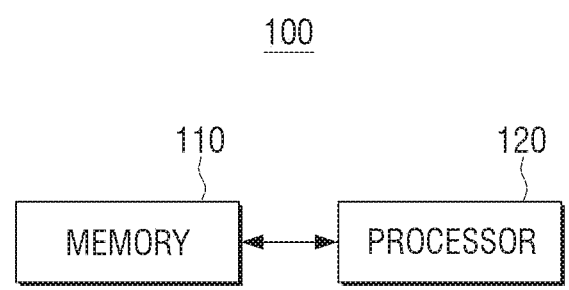
FIG. 2 is a block diagram illustrating a simple configuration of an electronic apparatus according to an embodiment of the disclosure.

FIG. 2 is a block diagram illustrating a simple configuration of the electronic apparatus according to the embodiment of the disclosure.

Referring to FIG. 2, the electronic apparatus 100 includes a memory 110 and a processor 120.

The memory 110 may store various programs and data required for an operation of the electronic apparatus 100. In detail, at least one command may be stored in the memory 110. The processor 120 may perform the above-described operation by executing an instruction stored in the memory 110. The memory 110 may be implemented by a non-volatile memory, a volatile memory, a flash memory, a hard disc drive (HDD), a solid state drive (SSD), and the like.

The processor 120 generally controls an operation of the electronic apparatus 100. In detail, the processor 120 may control the electronic apparatus 100 by executing at least one command stored in the memory 110.

According to an embodiment, the processor 120 may be implemented by a digital signal processor (DSP), a microprocessor, or a time controller (TCON). However, the processor 120 is not limited thereto, but may include one or more of a central processing unit (CPU), a micro controller unit (MCU), a micro processing unit (MPU), a controller, an application processor (AP), a communication processor (CP), an ARM processor, or may be defined by these terms. In addition, the processor 120 may be implemented by a system-on-chip (SoC) or a large scale integration (LSI) in which a processing algorithm is embedded, or may be implemented in a field programmable gate array (FPGA) form.

In detail, the processor 120 may acquire an output value by inputting an input value to the function module to perform a function corresponding to the function module included in the electronic apparatus 100. The function module may include a recognition module, an identification module, a control module, and the like.

In detail, the recognition module may acquire an output value based on an input value input from a sensor, a microphone, and the like. The output value acquired by the recognition module may be a value obtained by sensing the surrounding environment of the electronic apparatus 100. For example, the recognition module may output, as an output value, a result of recognizing an object included in an image using the image input by the sensor as an input value. Meanwhile, as described above, the input value may be a value obtained by a sensor (not shown). However, the input value is not limited thereto, but may be a value received from an external device or at least one of values output from the above-described function modules when the function modules are sequentially operated. For example, when the electronic apparatus 100 is a factory facility, the electronic apparatus 100 may receive a value sensed by an external sensor and use the received value as an input value. In addition, when the recognition module, the identification module, and the control module, which are function modules, operate sequentially, a value output from the recognition module may be used as an input value of the identification module.

In addition, the processor 120 may identify a safety mechanism to be applied to the function module based on the input value and the output value. Specifically, each of the function modules has a safety mechanism to be applied according to the safety integrity level, but based on the output value to the input value satisfying a preset condition, the safety mechanism may be additionally applied or the application of the previously applied safety mechanism may be stopped. An embodiment to which the additional safety mechanism is applied will be described below with reference to FIG. 7, and an embodiment in which the application of the previously applied safety mechanism is stopped will be described below with reference to FIG. 12.

In detail, the processor 120 may detect an error operation of the recognition module by applying the safety mechanism according to the safety integrity level of the recognition module based on the input value and the output value. For example, when the safety integrity level of the recognition module in the ASCC system is ASIL B, the safety mechanism may perform a range check input/output data. At this time, even if the range of the output value to the input value is within the normal range set by the safety mechanism, if the preset condition is satisfied, the processor 120 may identify the application of the additional safety mechanism.

For example, if the conditions that the number of times of input of the input value and the number of times of output of the output value may be different, or the output value for the input value has a tendency of approaching a boundary of a normal range, or the amount of change in an output value to an input value exceeds a preset value, and the like, are satisfied, the processor 120 may identify that the safety mechanism other than the previously applied safety mechanism is additionally applied. According to an embodiment, the processor 120 may apply a safety mechanism using algorithms (diverse software designs) that recognize an object included in an image other than a safety mechanism for performing a range check of input/output data.

If an error of a function module is detected by additionally applying a safety mechanism, the processor 120 may transition the electronic apparatus 100 to a safe state. In detail, the safety state refers to a state in which there is no damage even if an error occurs in the function module and may be a state where an error of the function module is notified, a state where power supplied to the electronic apparatus 100 is interrupted, a state where only the limited functions of the electronic apparatus 100 can be used, or the like.

Accordingly, the existing safety mechanism may properly recognize an object that is misrecognized. That is, according to the disclosure, an error that cannot be detected by the existing safety mechanism can be detected by applying an additional safety mechanism, and thus can be dealt with more quickly.

In addition, the identification module may identify whether an error occurs, an occurrence probability of risk, and a control value necessary to escape a risk based on the output value output from the recognition module. For example, if the recognition module outputs, as the output value, the recognition result that the front object is a vehicle and the accuracy of the recognition result, the identification module may identify the risk of collision with a forward vehicle using the output value as the input value and identify an acceleration value or a deceleration value for avoiding the risk.

In detail, the processor 120 may detect the error operation of the identification module by applying the safety mechanism according to the safety integrity level of the identification module based on the input value and the output value. For example, when the safety integrity level of the identification module in the ASCC system is the ASIL B, the safety mechanism may perform the range check input/output data. At this time, even if the range of the output value to the input value is within the normal range set by the safety mechanism, if the number of times of output and the number of times of input are different, or the tendency of the output value, the sudden amount of change in the output value, and the like are found, the processor 120 may additionally perform a plausibility check which is the safety mechanism detecting the error operation by comparing the output value with the previous output value.

Meanwhile, in one embodiment, the control module may convert the acceleration value or the deceleration value output from the identification module into a value required by a module responsible for acceleration or deceleration, and transfer the converted value to the corresponding module. In this case, the processor 120 may detect an error operation of the control module by applying the safety mechanism according to the safety integrity level of the control module based on the input value and the output value. In detail, the processor 120 may detect the increase or decrease of the speed and the like, with respect to the transferred acceleration value or deceleration value. When the increase or decrease is within a normal range, but has a tendency to be a problematic, the processor 120 may additionally perform the plausibility check which is the safety mechanism that detects an error operation compared to the previous output value.

In this case, the additional safety mechanism may be at least one of a plurality of safety mechanisms pre-stored in the memory 110 or may be one received from an external server. An embodiment of such a safety mechanism will be described below with reference to FIG. 6.

On the other hand, even if the function module relies on the result of applying the additional safety mechanism, if the input value and the output value of the function module are within the normal range and there are no conditions in which an error is suspected, the processor 120 may stop applying the additional safety mechanism and apply only the previously applied safety mechanisms.

On the other hand, in the case of a function with real-time property and without an error among the safety functions of the electronic apparatus 100, a detection of an error operation may be unnecessary. Specifically, when the input value input to the function module and the output value output by the function module based on the input value are applied to the previously applied safety mechanism according to the safety integrity level of the function module, if the input value and the output value are within the normal range and remain unsatisfied with the conditions suspected of having the error described above, the processor 120 may stop applying the previously applied safety mechanism.

As a result, unnecessary processing time, resources, and the like, may be reduced. An embodiment of stopping applying the safety mechanism as described above will be described below in more detail with reference to FIG. 12.

Meanwhile, the identifying of the safety mechanism to be applied to the function module as described above may be performed by an artificial intelligence model stored in the memory 110. The artificial intelligence model used in the disclosure may use various networks, such as a deep neural network (DNN), a convolutional neural network (CNN), a recurrent neural network (RNN), a restricted Boltzmann machine (RBM), a deep belief network (DBN), and a deep Q-networks (DQN).

Specifically, the artificial intelligence model may learn the safety mechanism applied to the function module in various situations.

For example, if additional safety mechanisms other than the preset safety mechanism are applied by satisfying the preset conditions of suspecting an error even if the result of applying the preset safety mechanism to the input value and the output value of the function module is within the normal range, the intelligence model can learn the additional safety mechanisms as safety mechanisms for the input and output values of the function module.

Training the safety mechanism means that by applying various additional safety mechanisms other than the safety mechanisms that is previously applied according to the safety integrity level, the safety mechanism which can sense the error operation of the corresponding function module based on the input value and the output value of the function module is updated to the safety mechanism that can applied to the input value and the output value of the corresponding function module.

In detail, the artificial intelligence model may apply additional safety mechanisms, respectively, to acquire whether to detect the error operation of the corresponding function module, the time required for detection, and the like. In addition, the artificial intelligence model may identify a safety mechanism having the highest priority as the safety mechanism to be additionally applied, as a result of scoring each of the additional safety mechanism performed based on the acquired detection, required time, and the like.

In addition, training the safety mechanism may include not only identifying the additional safety mechanism, but also updating optimal parameters to be applied to the previously applied safety mechanism or the additional safety mechanism.

In another embodiment, when a user suspects an error and performs manual control even when the result of applying the preset safety mechanism to the input value and the output value of the function module is within the normal range, the artificial intelligence model may learn a manual control operation according to the input value and the output value. In this case, the artificial intelligence model may learn an additional safety mechanism based on the input value, the output value, and the manual control operation depending on the input and output values. A more detailed training process will be described below with reference to FIGS. 10, 11A and 11B.

Meanwhile, the trained artificial model may design a safety mechanism to be applied based on the input value input to the function module and the output value depending on the input value. That is, it is possible to design an optimal safety mechanism capable of detecting an error of a suspected function module based on the input value and the output value without being constrained by the preset safety mechanism according to the safety integrity level of the function module.

Therefore, according to the disclosure, the error that cannot be detected by the existing safety mechanism can be detected by applying the additional safety mechanism, and thus can be dealt with more quickly.

Figure 3:
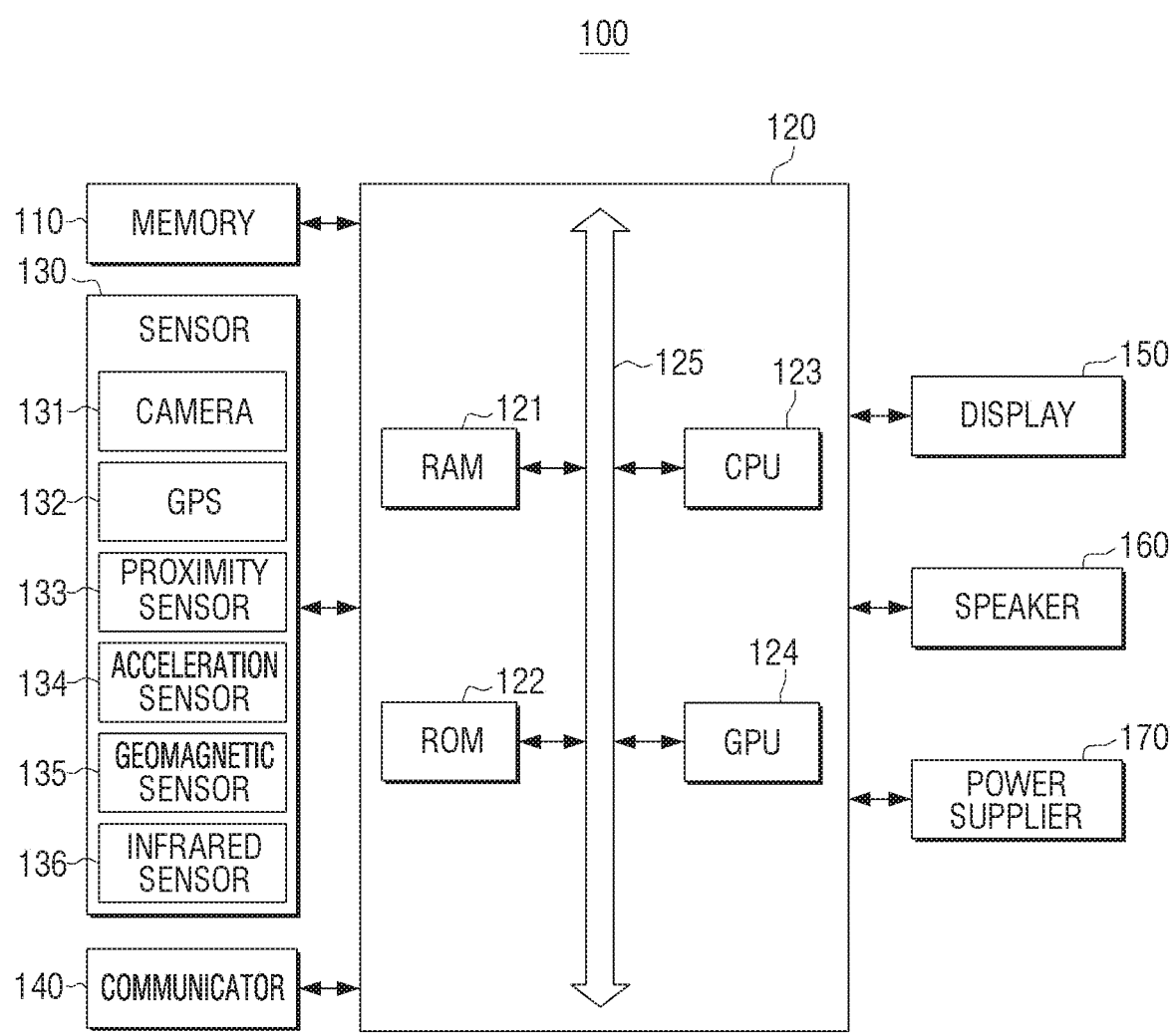
FIG. 3 is a block diagram illustrating a specific configuration of an electronic apparatus disclosed in FIG. 2 according to an embodiment of the disclosure.

FIG. 3 is a block diagram illustrating a specific configuration of an electronic apparatus disclosed in FIG. 2 according to an embodiment of the disclosure.

Referring to FIG. 3, the electronic apparatus 100 may include a memory 110, a processor 120, a sensor 130, a communicator 140, a display 150, a speaker 160, and a power supply 170. The memory 110 and the processor 120 are the same as those shown in FIG. 2, and therefore a duplicate description thereof will be omitted.

The processor 120 may include a RAM 121, a ROM 122, a CPU 123, a GPU 124, and a bus 125. The RAM 121, the ROM 122, the CPU 123, the GPU 124, and the like, may be connected to each other through the bus 125.

The CPU 123 accesses the memory 110 to perform booting using an operating system (O/S) stored in the memory 110. In addition, the CPU 123 performs various operations using various programs, contents, data, and the like, stored in the memory 110.

An instruction set for booting a system, and the like, is stored in the ROM 122. When a turn-on command is input to supply power, the CPU 123 may copy the O/S stored in the memory 110 to the RAM 121 depending on an instruction stored in the ROM 122, and execute the O/S to boot the system. When the booting is completed, the CPU 123 copies various programs stored in the memory 110 to the RAM 121, and executes the programs copied to the RAM 121 to perform various operations.

The GPU 124 displays a UI on the display 150 when the booting of the electronic apparatus 100 is completed. In detail, the GPU 124 may render a screen including various objects, such as an icon, an image, and a text using a calculator (not illustrated) and a renderer (not illustrated). The calculator calculates attribute values, such as coordinate values at which the respective objects will be displayed, forms, sizes, colors, and the like of the respective objects depending on a layout of a screen. The renderer renders screens of various layouts including objects on the basis of the attribute values calculated in the calculator. The screens (or user interface windows) rendered in the renderer are provided to the display 150 and are displayed on a main display region and a sub display region, respectively.

The sensor 130 may include a plurality of sensors configured to sense environmental information of the electronic apparatus 100. For example, the sensor 130 may include a camera 131, a GPS 132, a proximity sensor 133, an acceleration sensor 134, a geomagnetic sensor 135, an infrared sensor 136, and the like.

The camera 131 may be at least one still camera or at least one video camera configured to record an external environment or an inside of the electronic apparatus 100 as an image.

The GPS 132 may be a sensor configured to estimate a geographical location of the electronic apparatus 100. That is, the GPS 132 may include a transceiver configured to estimate the location of the electronic apparatus 100 with respect to the earth.

The proximity sensor 133 may be a sensor for sensing an object existing within a preset distance around the electronic apparatus 100. In detail, the proximity sensor 133 may include an ultrasonic sensor, an optical sensor, and the like, and the camera 131 or the infrared sensor 136 may serve as the proximity sensor 133.

The functions of the respective sensors can be intuitively inferred by those skilled in the art from the names, and therefore a detailed description thereof will be omitted. In addition, although not shown, an inertial measurement unit (IMU), a RADAR, a temperature/humidity sensor, a barometric pressure sensor, an RGB sensor, and the like, may be further provided.

The communicator 140 is a component performing communication with various types of external devices in various types of communication manners. The electronic apparatus 100 may perform communication from an external device through a wired or wireless manner. In this case, the external device may be a sensor device, a server, and the like, that is a separate device from the electronic apparatus 100.

When the electronic apparatus 100 is capable of wireless communication, the communicator 140 may include a Wi-Fi chip, a Bluetooth chip, a wireless communication chip, and an NFC chip. In detail, the Wi-Fi chip and the Bluetooth chip perform communication in a Wi-Fi manner and a Bluetooth manner, respectively. In the case of using the Wi-Fi chip or the Bluetooth chip, various connection information, such as a service set identifier (SSID), a session key, and the like, is first transmitted and received, communication is connected using the connection information, and various information may then be transmitted and received. The wireless communication chip, means a chip performing communication depending on various communication protocols, such as Institute of Electrical and Electronics Engineers (IEEE), Zigbee, $3^{rd}$ generation (3G), $3^{rd}$ generation partnership project (3GPP), long term evolution (LTE), and the like. The NFC chip, means a chip operated in a near field communication (NFC) manner using a band of 13.56 MHz among various radio frequency identification (RFID) frequency bands, such as 135 kHz, 13.56 MHz, 433 MHz, 860 to 960 MHz, 2.45 GHz, and the like.

Meanwhile, when the electronic apparatus 100 is capable of wired communication, the communicator 140 may include various ports for connecting a cable. For example, the communicator 140 may include a wired Ethernet, a USB port, a component port, a PC port, and the like.

The communicator 140 may receive an input value from an external device. The input value may be a value sensed by an external sensor or an output value output from an external device.

Meanwhile, the communicator 140 may receive information to be used for detecting an error operation from an external server. For example, the communicator 140 may receive information on a safety mechanism to be used for detecting an error operation from an external server. In detail, the processor 120 may receive information on the identified safety mechanism from an external server and detect an error operation of the corresponding function module. Meanwhile, the processor 120 may transmit an input value, an output value, index information on the identified safety mechanism, and the like, to an external server, and cause the external server to detect the error operation of the function module. In addition, the communicator 140 may receive a detection result value of the error operation of the function module.

The processor 120 may perform an operation corresponding to the error operation of the function module depending on the detection result. In detail, based on the error operation of the function module being detected, the processor 120 may provide feedback to the user about the detected error operation. In this case, the processor 120 may provide a user with a function name, an error type, a solution, and the like, in which the error operation is detected through the display 150 provided in the electronic apparatus 100.

The display 150 may be implemented by various types of displays, such as a liquid crystal display (LCD), an organic light emitting diode (OLED) display, a plasma display panel (PDP), and the like. A driving circuit, a backlight unit, and the like, that may be implemented in a form, such as a-si TFT, low temperature poly silicon (LTPS) TFT, an organic TFT (OTFT), and the like, may be included in the display 150. In addition, the display 150 may be implemented as a flexible display or may be a touch screen capable of touch input.

For example, when the electronic apparatus 100 is a vehicle, the display 150 may be provided to provide a user interface for a dashboard, a heads-up display or navigation, a temperature control, an audio control, and the like. In response to an error being detected in at least one of the plurality of function modules constituting the electronic apparatus 100, the information on the detected error may be displayed on the display 150.

Meanwhile, the processor 120 may provide a user with a function name, an error type, a solution, and the like, in which the error operation is detected through the speaker 160 provided in the electronic apparatus 100.

Meanwhile, when the error operation is detected in the function module, the processor 120 may transition the electronic apparatus 100 to a safe state. The safety state may mean a state which does not harm a user or the surrounding environment even if an error occurs in the function module.

For example, when an error that may cause serious damage in case of the malfunction, such as an engine failure, is detected, the processor 120 may control the power supply 170 to cut off power supplied to the electronic apparatus 100.

On the other hand, for example, if the detected error does not cause significant damage even when malfunctions, such as a failure of a front camera occurs, the processor 120 uses the electronic apparatus 100 to use only limited functions, except those related to the front camera. In this case, as described above, the processor 120 may provide the user with the information on the error operation through at least one of the display 150 or the speaker 160.

In addition, although not shown in FIG. 3, when the electronic apparatus 100 is a vehicle, the electronic apparatus 100 may further include a brake, a steering device, a transmission, a wheel, a light, a direction indicator, a wiper, and the like, which are general components of the vehicle.

Figure 4:
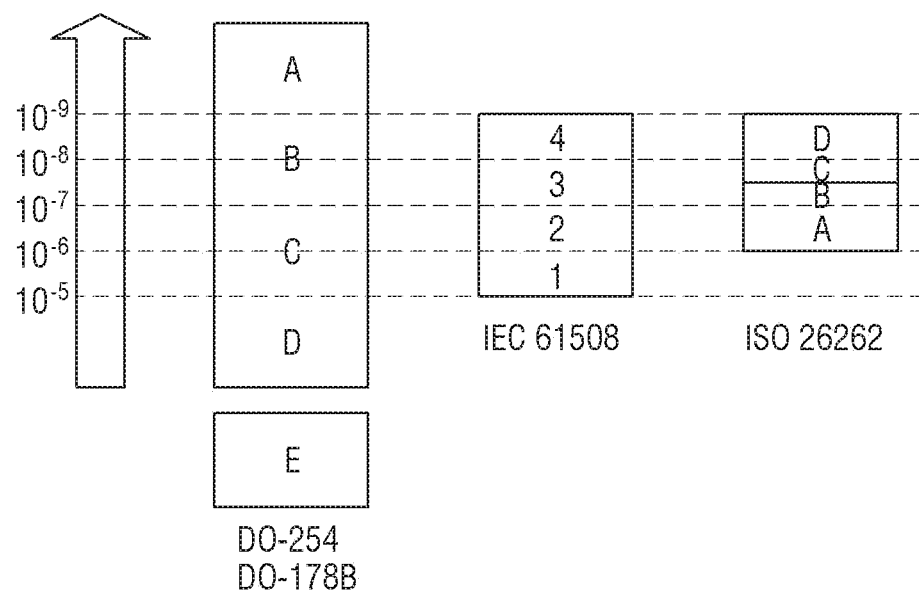
FIG. 4 is a diagram illustrating a safety integrity level according to various standards according to an embodiment of the disclosure.

FIG. 4 is a diagram illustrating a safety integrity level according to various standards according to the embodiment of the disclosure.

Referring to FIG. 4, the safety integrity level is presented based on the probability of failure, and the levels are classified according to different criteria for each standard. In FIG. 4, DO-254, DO-178B, IEC 61508, and ISO 26262 are described as one embodiment among various standards.

Specifically, the DO-254 is an avionics certification standard, and the DO-178B is an aeronautical software certification standard. DO-254 and DO-178B have a lower risk level from level A toward level E in the event of a failure. The number of satisfaction requirements increases from level E toward level A.

Specifically, the level A of the DO-254 and the DO-178B is a failure level having the risk of falling, and the probability of failure should satisfy $10^{-9}$ or less. On the other hand, the level E of the DO-254 and the DO-178B is a failure level that does not affect safety, flight coordination, or pilot overload and is a relatively high probability of failure that should be satisfied.

The IEC 61508 is an international standard for industry-specific rules, entitled 'Functional Safety of Electrical, Electronic and Programmable Electronic Safety Management Systems'. The IEC 61508 is prepared to be a basic functional safety standard applicable to all kinds of industries.

Specifically, the safety integrity level of the IEC 61508 is defined as "the probability that a safety-related system under given conditions can satisfactorily perform the required safety functions in a given time", with SIL 4 being the highest level and SIL 1 being the lowest level.

The ISO 26262 is an international standard for automotive functional safety, and is an international standard for automotive functional safety designed to prevent accidents caused by errors in the electrical and electronic systems installed in automobiles.

The ISO 26262 is an adaptation of the functional safety standard IEC 61508 to automotive electrical/electronic systems. The ISO 26262 defines the functional safety of automotive equipment that is applicable throughout the product life cycle of all automotive electrical and electronic safety related systems, with ASIL D the highest level and ASIL A the lowest level.

Hereinafter, FIGS. 5 and 6 will be described based on ISO 26262 for convenience of description. FIG. 5 is a diagram illustrating a safety integrity level for each safety function of a vehicle according to the embodiment of the disclosure.

Referring to FIG. 5, various safety functions, failure situations for each safety function, and safety integrity levels of a vehicle are illustrated. The safety integrity level is based on the ISO 26262 standard.

As shown in FIG. 4, the ASIL A level is the lowest level, the ASIL D level is the highest level, and the lower the level, the lower the risk level, and the higher the level, the higher the risk level.

For example, referring to the table of FIG. 5, a rear light of a vehicle is a light that illuminates the rear of the vehicle when a front light is turned on and is disposed at both rear sides of the vehicle. It is detected that an error occurs in a function when both rear lights fail. The rear light is not a threat to safety of a user simply by an error operation, and therefore the safety integrity level is ASIL A which is the lowest level.

On the other hand, an airbag system is considered to be in a failure state when unintended deployment is performed. If the airbag is unintentionally deployed while driving, the safety of the driver is directly threatened, and the airbag system is ASIL D which is the highest level.

Meanwhile, a function and a failure situation of the electronic apparatus shown in FIG. 5 are merely exemplary, and a function and a failure situation of the electronic apparatus are not limited to those shown in FIG. 5.

As such, each function of the electronic apparatus may have a different safety integrity level for each function, and a safety mechanism for identifying whether a failure situation occurs may be differently applied according to the safety integrity level. The safety mechanism applied to the safety integrity level will be described below in detail with reference to FIG. 6.

FIG. 6 is a diagram illustrating a safety mechanism applied to each safety integrity level according to the embodiment of the disclosure.

Referring to FIG. 6, various safety mechanisms of 1a to 1f are shown. In this case, the safety mechanism may be subjected to an elaborate process that requires more resources or time to detect an error operation from 1a toward 1f.

In the table of FIG. 6, '++' means that the safety mechanism is highly recommended, '+' means that the safety mechanism is recommended, and '0' means that the safety mechanism is not recommended.

For example, when the function module is ASIL A, the safety mechanism 1a, which performs the range check of input/output data, is strongly recommended, and the safety mechanism 1b which checks the plausibility and the safety mechanism 1c which detects an error of data are recommended.

As the safety integrity level progresses from ASIL A toward ASIL D, the strongly recommended safety mechanism increases.

The ADAS ASCC system, which keeps a distance from the forward vehicle constant, has an ASIL B level, and detects an error operation by applying only previously strongly recommended safety mechanism 1a. However, according to the disclosure, it is identified in that the safety mechanism 1a is within a normal range and therefore there is no error, but in further consideration of the tendency and the like, of the input and output values, a safety mechanism 1f is not recommended in ASIL B, may be additionally applied. The operation of additionally applying the safety mechanism 1f is merely an embodiment, and at least one safety mechanism selected from some of the safety mechanisms that are not applied at the corresponding safety integrity level, for example, safety mechanisms that are simply recommended or safety mechanisms which are not recommended may be additionally applied.

Accordingly, according to the disclosure, it is possible to detect an error operation of a function module that cannot be previously detected, and to deal with a risk situation more quickly.

Figure 7:
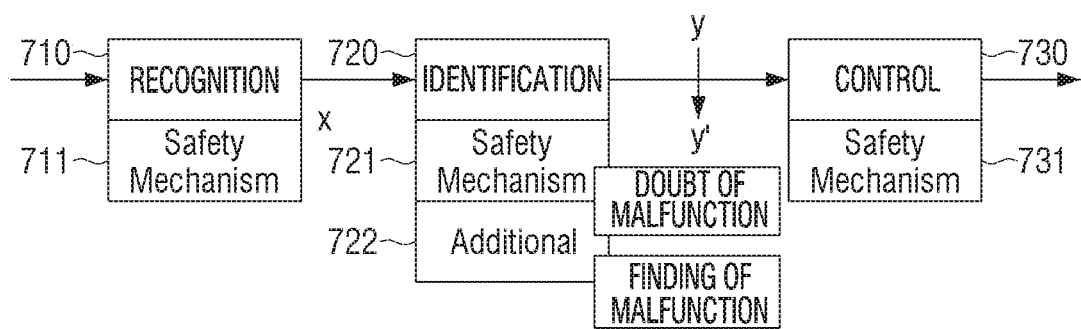
FIG. 7 is diagram illustrating additionally applying a safety mechanism according to an embodiment of the disclosure.

FIG. 7 is a diagram illustrating additionally applying a safety mechanism according to an embodiment of the disclosure. The electronic apparatus may include a plurality of function modules, and for the convenience of description, the disclosure restrictedly describes an embodiment in which the recognition module, the identification module, and the control module sequentially operate, but the type and operation of the function module are not limited thereto.

Referring to FIG. 7, a recognition module 710, an identification module 720, and a control module 730 may sequentially operate. In this case, the recognition module 710 may output an output value x using a sensing value and the like, as an input value. The identification module 720 may output an output value y using x output from the recognition module 710 as an input value. The control module may output a control value for controlling an electronic apparatus using y output from the identification module 720 as an input value.

In this case, safety mechanisms 711, 721, and 731 according to a safety integrity level of each module are applied to the recognition module 710, the identification module 720, and the control module 730, respectively, and it may be checked whether an error occurs in each module.

On the other hand, for example, as a result of applying the safety mechanism 721 according to the safety integrity level of the identification module 720 to the input value x and the output value y of the identification module 720, when the values are within a normal range but a malfunction is suspected, the electronic apparatus may apply an additional safety mechanism 722 to the identification module 720. At this time, the malfunction of the identification module 720 that was not found may be found as a result of applying the additional safety mechanism 722. As the additional safety mechanism 722 is applied, the output value of the identification module 720 changes from y to y'. Meanwhile, the electronic apparatus may change to a safe state as the malfunction is found.

The operation of the electronic apparatus according to the disclosure described above may be implemented by the following example scenario.

Example 1: ADAS ASCC

When the electronic apparatus is a vehicle, a safety integrity level of a recognition module, an identification module, and a control module in ADAS ASCC is an ASIL B level. At this time, a strongly recommended safety mechanism may be 1a (range check of input/output data). As one embodiment, when the recognition accuracy of the recognition module is 50% or more, it may be identified that the object recognition is a normal operation. In this case, when the recognition accuracy of the recognition module is less than 50%, the electronic apparatus may immediately identify that there is an error in the operation of the recognition module and the electronic apparatus changes to a safe state.

First, the recognition module of the electronic apparatus may receive an image obtained by photographing the front of the electronic apparatus and a distance value from a front object using a radar. In one embodiment, the recognition module may receive an image of 30 frames per second. The recognition module may recognize an object included in the input image. When the recognition module recognizes that the object included in the image is a vehicle, the recognition module may output the recognition result and the accuracy thereof.

When the output accuracy is reduced from 85% to 55%, it is identified that the safety mechanism 1a is a normal operation of 50% or more. However, when the input value and the output value to the input value satisfy the preset condition, the electronic apparatus may identify whether the operation of the recognition module is not a malfunction by applying an additional safety mechanism. For example, when the number of input values and the number of output values are different, or the output values to similar input values have a difference greater than or equal to a preset value, or the output values tend to be close to a boundary of the normal range, the electronic apparatus may apply an additional safety mechanism. In this case, the additional safety mechanism may not be applied at the safety integrity level of the existing recognition module.

For example, the electronic apparatus may additionally apply a safety mechanism 1f (diverse software design) among the plurality of safety mechanisms to recognize the object included in the input image with other algorithms. In this case, when the recognized object is not a vehicle by applying the safety mechanism 1f, the electronic apparatus may identify that there is an error in the recognition module, and may increase the recognition accuracy by applying other algorithms to correct the error.

Meanwhile, the electronic apparatus may apply an additional safety mechanism when it is difficult to detect an error only by a safety mechanism 1a that checks a range of an input value and an output value.

For example, when the distance from the front object detected by the radar is suddenly detected from 100 m to 500 m, the error operation cannot be identified only by the safety mechanism 1a, and therefore the electronic apparatus may additionally apply a safety mechanism 1b (plausibility check) among the plurality of safety mechanisms to detect the error operation of the recognition module. As one embodiment, when using the artificial intelligence model, when the distance from the detected front object is suddenly detected from 100 m to 500 m, the electronic apparatus may identify that the accuracy of the distance from the detected front object is less than or equal to a preset value. Accordingly, the electronic apparatus may apply an additional safety mechanism to detect the error operation of the recognition module.

Example 2: Control of Robotic Arm

When the electronic apparatus is a robot, the robotic arm needs to monitor a distance from a person around the robot and a speed of a person, and control a force of an actuator of the robot. In this case, a safety integrity level of a recognition module, an identification module, and a control module of a robot is usually a SIL 2 level. At this time, a strongly recommended safety mechanism may be 1a (range check of input/output data).

First, the recognition module of the electronic apparatus may receive a presence and a distance value of a surrounding object from a sensor provided in the electronic apparatus. In one embodiment, the recognition module may receive a sensing value sensed 30 times per second from the sensor. In addition, the recognition module may output a recognition rate for whether the surrounding object is recognized as a person and output a distance value in consideration of a speed of a person.

In this case, when the number of input values and the number of output values are different or the range of the output values is greater than or equal to a preset value, the electronic apparatus may suspect a malfunction of the recognition module and apply an additional safety mechanism. For example, the electronic apparatus may additionally apply a safety mechanism 1e (control flow monitoring) to the recognition module. The safety mechanism 1e may identify whether essential functions (check points) to be performed by the recognition module are performed in time and whether the corresponding functions are executed in a predetermined order.

Meanwhile, the identification module of the electronic apparatus may receive a recognition rate for a person and a distance value from the person from the recognition module, and output a collision risk with a person and a maximum numerical value of a force of a robotic arm based on the received recognition rate and value. In this case, when a range of the output risk and maximum numerical value is greater than or equal to a preset value, the electronic apparatus may suspect a malfunction of the identification module and apply an additional safety mechanism. For example, the electronic apparatus may additionally apply a safety mechanism 1e (control flow monitoring) to the recognition module.

Meanwhile, the control module of the electronic apparatus may receive the maximum numerical value of the force of the robotic arm output from the identification module, and convert and deliver the numerical value received to the module in charge of the movement of the robotic arm. In this case, when the increase or decrease in the force output from the robotic arm is greater than or equal to the preset value compared to the delivered value, the electronic apparatus may suspect a malfunction of the control module and apply an additional safety mechanism. For example, the electronic apparatus may additionally apply a safety mechanism 1b (plausibility check) to the recognition module. In this case, the safety mechanism 1b may compare the output value to the input value from a reference model instead of checking only a simple range. That is, the safety mechanism 1b is a manner of detecting the safety mechanism abnormality by comparing an independent comparison target value with an actual value. In this example, when a general comparison target model for the increase or decrease of the force of the robotic arm is stored, the electronic apparatus may identify a difference between a command value input to an actual control module with a value proposed from a stored comparison target model, thereby detecting the abnormality of the control module.

Meanwhile, it is has already been described that when the input value and the output value satisfy preset conditions, at least one of the plurality of safety mechanisms is additionally applied by the processor included in the electronic apparatus. However, a safety mechanism to be applied to each module may be identified using the artificial intelligence model (AI engine) trained as shown in FIGS. 8 and 9.

Figure 8:
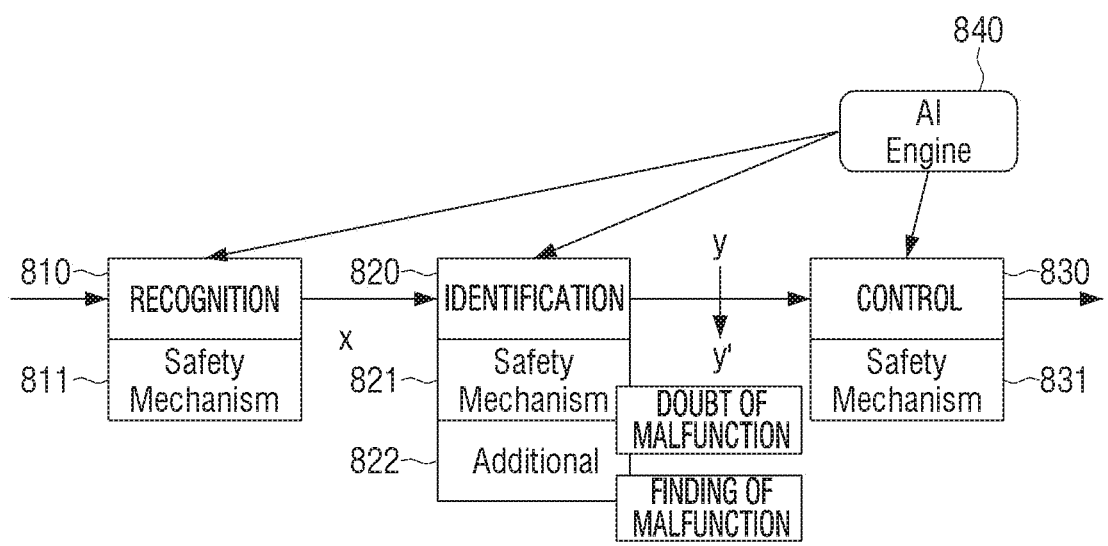
FIG. 8 is diagram illustrating additionally applying a safety mechanism according to an embodiment of the disclosure.
Figure 9:
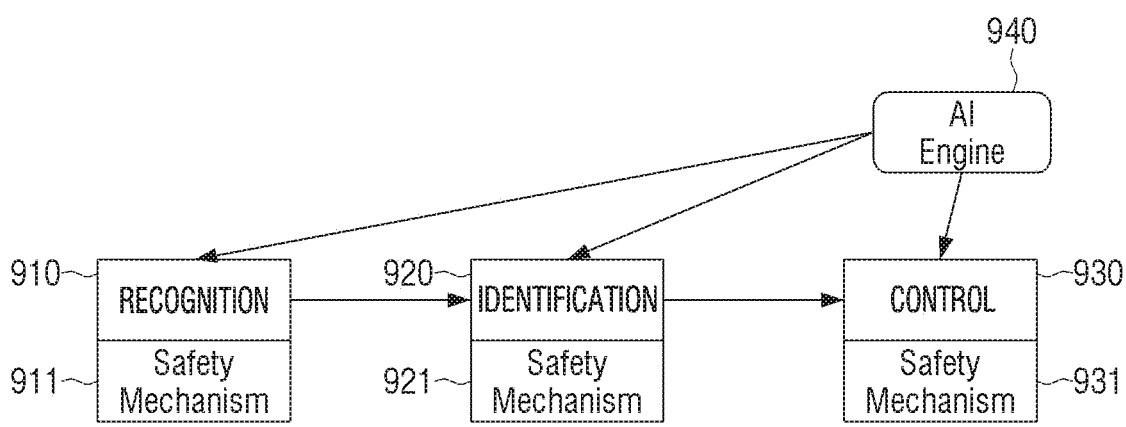
FIG. 9 is a diagram illustrating applying a safety mechanism of a function module according to an embodiment of the disclosure.

FIG. 8 is a diagram illustrating additionally applying a safety mechanism according to an embodiment of the disclosure.

Referring to FIG. 8, operations of a recognition module 810, an identification module 820, and a control module 830 and safety mechanisms 811, 821, and 831 applied to each of the recognition module 810, the identification module 820, and the control module 830 depend on a safety integrity level, which may be the same as those shown in FIG. 7.

However, each of the recognition module 810, the identification module 820, and the control module 830 may be controlled by a trained artificial intelligence model 840. In detail, the trained AI model 840 may identify an additional safety mechanism 822 to be applied other than safety mechanisms 811, 821, and 831 according to the safety integrity level based on input values and output values of each function module.

In this case, the trained artificial intelligence model 840 has already been trained and may be inserted when the electronic apparatus is manufactured, and may be continuously trained by the use process of the electronic apparatus, the manual operation of the user and the like.

Meanwhile, FIG. 8 illustrates and describes that an additional safety mechanism other than the safety mechanism previously applied according to the safety integrity level of the function module is applied, but the safety mechanism to be applied to the function module as shown in FIG. 9 may be identified regardless of the safety integrity level.

FIG. 9 is a diagram illustrating applying a safety mechanism of a function module according to an embodiment of the disclosure.

Referring to FIG. 9, an artificial intelligence model 940 may identify safety mechanisms 911, 921, and 922 to be applied to each of the recognition module 910, the identification module 920, and the control module 930 of the electronic apparatus. At this time, the artificial intelligence model 940 may identify the safety mechanisms 911, 921, and 922 to be applied to the respective function modules 910, 920, and 930 based on the input values and the output values of the respective function modules 910, 920, and 930. Each of the safety mechanisms 911, 921, and 922 may include at least one safety mechanism.

In this case, the artificial intelligence model 940 may identify the safety mechanisms 911, 921, and 922 to be applied regardless of the safety integrity levels of each of the function models 910, 920, and 930 of the artificial intelligence model 940. Accordingly, each of the safety mechanisms 911, 921, and 922 may not include a safety mechanism that is strongly recommended according to the safety integrity levels of each function module 910, 920, and 930.

In this case, the trained artificial intelligence model 940 has already been trained using the input values and the output values of each function modules as the input value, and may be inserted during the manufacturing of the electronic apparatus, and then may be continuously trained by the use process of the electronic apparatus, the manual operation of the user, and the like.

As such, by identifying the safety mechanism to be applied to each function module by using the trained AI model, it is possible to detect a failure situation more quickly and accurately.

Figure 10:
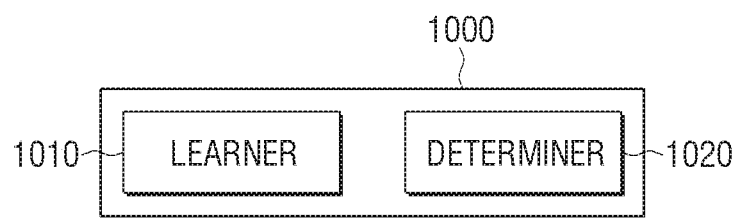
FIG. 10 is a block diagram illustrating a configuration of an electronic apparatus for training and using an artificial intelligence model, according to an embodiment of the disclosure.

FIG. 10 is a block diagram illustrating a configuration of an electronic apparatus for training and using an artificial intelligence model, according to an embodiment of the disclosure.

Referring to FIG. 10, a processor 1000 may include at least one of a learner 1010 and a determiner 1020. The processor 1000 of FIG. 10 may correspond to a processor 120 of FIG. 2, an artificial intelligence model 840 of FIG. 8, and an artificial intelligence model 940 of FIG. 9.

The learner 1010 may generate or learn a model for identifying a safety mechanism. The learner 1010 may generate an artificial intelligence model for identifying a safety mechanism to be applied to a function module by using the collected training data. The learner 1010 may create a trained model having a criterion for identifying a safety mechanism to be applied to a function module by using the collected training data. The learner 1010 may correspond to a training set of the artificial intelligence model.

For example, the learner 1010 may use the input/output value of the function module and the safety mechanism corresponding to the input/output value as input data to generate, learn, or update a model for predicting at least one safety mechanism to be applied to the function module among the plurality of safety mechanisms. The safety mechanism corresponding to the input/output value used as the input data may mean a predetermined safety mechanism that should be applied to detect the error of the function module according to the input value and the output value of the corresponding function module.

In addition, the learner 1010 may generate, learn, or update a model for predicting at least one safety mechanism to be applied to the function module by using the input value and the output value of the function module, the control value and the input/output value according to the manual operation of the user, and the safety mechanism corresponding to the control value as the input data.

The determiner 1020 may obtain various information by using predetermined data as input data of the trained model. As an example, when the input value and the output value of the function module are input, the determiner 1020 may acquire (or recognize, estimate, or infer) information related to the error of the function module.

At least a part of the learner 1010 and at least a part of the determiner 1020 may be implemented by a software module or manufactured in the form of at least one hardware chip and mounted on the electronic apparatus. For example, at least one of the learner 1010 or the determiner 1020 may be manufactured in a form of a dedicated hardware chip for artificial intelligence (AI) or may be manufactured as a part of the existing general-purpose processor (e.g., a CPU or an application processor) or a graphic-dedicated processor (e.g., a GPU) and mounted on various electronic apparatus described above. In this case, the dedicated hardware chip for artificial intelligence is a dedicated processor specialized in probability calculation, and has a higher parallel processing performance than the existing general-purpose processor, thereby making it possible to process a computational task in an artificial intelligence field, such as machine learning, quickly. When the learner 1010 and the determiner 1020 are implemented as the software module (or a program module including an instruction), the software module may be stored in computer-readable non-transitory computer readable media. In this case, the software module may be provided by an operating system (OS) or may be provided by a predetermined application. Alternatively, some of the software modules may be provided by an operating system (OS), and the others may be provided by a predetermined application.

In this case, the learner 1010 and the determiner 1020 may be mounted on one electronic apparatus, such as a server, or may be mounted on separate electronic apparatuses, respectively. For example, one of the learner 1010 and the determiner 1020 may be included in an electronic apparatus, such as a vehicle and a robot, and the other may be included in an external server. In addition, the learner 1010 and the determiner 1020 may provide model information constructed by the learner 1010 to the determiner 1020 in a wired or wireless manner, or may provide data input to the learner 1010 to the learner 1010 as additional training data.

Figures 11A, 11B:
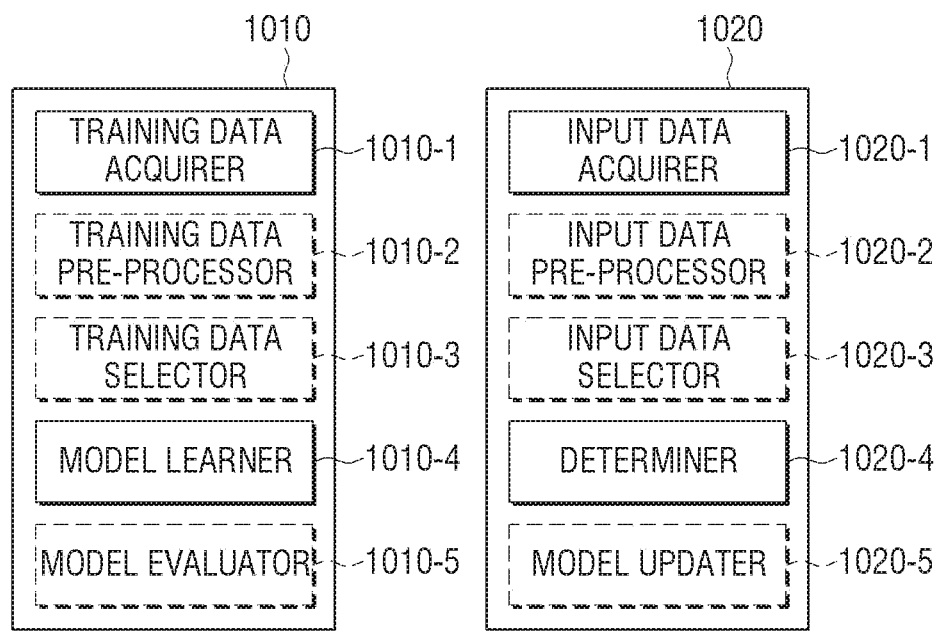
FIGS. 11A and 11B are block diagrams illustrating a detailed configuration of a learner and an acquirer of FIG. 10 according to an embodiment of the disclosure.

FIGS. 11A and 11B are block diagrams illustrating a detailed configuration of a learner and an acquirer of FIG. 10 according to the embodiment of the disclosure.

Referring to FIG. 11A, a learner 1010 according to some embodiments may include a training data acquirer 1010-1 and a model learner 1010-4. In addition, the learner 1010 may further include at least one of a training data preprocessor 1010-2, a training data selector 1010-3, and a model evaluator 1010-5.

The training data acquirer 1010-1 may acquire training data required for a model. As the embodiment of the disclosure, the training data acquirer 1010-1 may acquire a safety mechanism and the like, corresponding to an input value, an output value, and an input/output value of a function module as a training data. In detail, the training data acquirer 1010-1 may acquire the control value and the input/output value according to the manual operation of the user, the safety mechanism corresponding to the control value, and the like, as the training data in addition to the input value and the output value of the function module.

The model learner 1010-4 may learn how to correct a difference between information on an actual situation and whether an error is detected by a safety mechanism acquired using the training data. For example, the model learner 1010-4 can learn the artificial intelligence model by supervised learning using at least some of the learning data as the identification criterion. Alternatively, the model learner 1010-4 may train an artificial intelligence model through unsupervised learning that finds a criterion for identifying a situation by, for example, training by itself using training data without any guidance. As still another example, the model learner 1010-4 may learn the data recognition model through reinforcement learning that uses feedback on whether or not a result of the situation identification according to the learning is correct. In addition, the model learner 1010-4 may train the artificial intelligence model using a learning algorithm or the like, including, for example, an error back-propagation or a gradient descent.

When the data recognition model is trained, the model learner 1010-4 may store the trained artificial intelligence model. In this case, the model learner 1010-4 may store the trained artificial intelligence model in a server (e.g., an artificial intelligence server). Alternatively, the model learner 1010-4 may store the trained artificial intelligence model in a memory of an electronic apparatus connected to the server through a wired or wireless network.

The training data preprocessor 1010-2 may preprocess the acquired data so that the acquired data can be used for training to identify a safety mechanism to be applied to the function module among the plurality of safety mechanisms. The training data preprocessor 1010-2 may process the acquired data into a predefined format so that the model learner 1010-4 can use the acquired data for training to identify a safety mechanism to be applied to detect an error of the function module.

The training data selector 1010-3 may select data necessary for learning from data acquired by the training data acquirer 1010-1 or data preprocessed by the training data preprocessor 1010-2. The selected training data may be provided to the model learner 1010-4. The training data selector 1010-3 may select training data necessary for training from the acquired or preprocessed data according to a predetermined selection criterion. In addition, the training data selector 1010-3 may select training data according to a preset selection criterion for training by a model learner 1010-4.

The learner 1010 may further include a model evaluator 1010-5 to improve the recognition result of the artificial intelligence model.

The model evaluator 1010-5 may input evaluation data to the artificial intelligence model, and may allow the model learner 1010-4 to learn the artificial intelligence model again in a case where the recognition result output from the evaluation data does not satisfy a predetermined criterion. In this case, the evaluation data may be predefined data for evaluating the artificial intelligence model.

For example, the model evaluator 1010-5 may evaluate that the trained data recognition model does not satisfy a predetermined criterion in a case where the number or a ratio of evaluation data whose recognition results are not accurate exceeds a preset threshold value among recognition results of the trained artificial intelligence model for the evaluation data.

Meanwhile, in a case where there are a plurality of trained artificial intelligence models, the model evaluator 1010-5 may evaluate whether or not the respective trained artificial intelligence models satisfy a predetermined criterion, and identify a trained artificial intelligence model satisfying the predetermined criterion as a final artificial intelligence model. In this case where the number of trained data recognition models satisfying the predetermined criterion is plural, the model evaluator 1010-5 may identify any one preset trained artificial intelligence model or a predetermined number of trained data recognition models as a final artificial intelligence model in descending order of an evaluation score.

Referring to FIG. 11B, a determiner 1020 according to some embodiments may include an input data acquirer 1020-1 and a determiner 1020-4.

In addition, the determiner 1020 may further include at least one of an input data preprocessor 1020-2, an input data selector 1020-3, a model updater 1020-5.

The input data acquirer 1020-1 may acquire an input/output value of the function module and a safety mechanism corresponding to the input/output value as input data. Alternatively, the input data acquirer 1020-1 may acquire the control value and the input/output value according to the manual operation of the user for the input value and the output value of the function module, and the safety mechanism corresponding to the control value as the input data. The determiner 1020-4 may acquire a result of processing the input data by applying the input data acquired by the input data acquirer 1020-1 to an artificial intelligence model trained with the input value. The determiner 1020-4 may apply the data selected by the input data preprocessor 1020-2 or the input data selector 1020-3 to be described below to the artificial intelligence model as the input value to acquire the result of processing the input data.

As an example, the determiner 1020-4 may apply the input value and the output value of the function module acquired by the input data acquirer 1020-1, the control value according to the manual operation of the user, and the like, to the trained model to acquire (or estimate) the identification result of at least one safety mechanism to be applied to detect the error of the function module.

The determiner 1020 may further include the input data preprocessor 1020-2 and the input data selector 1020-3 to improve the recognition result of the artificial intelligence model or to save resources or time for providing the recognition result.

The input data preprocessor 1020-2 may preprocess the acquired data so that the acquired data can be used to be input to the first and second models. The input data preprocessor 1020-2 may process the acquired data into a predefined format so that the determiner 1020-4 can use the acquired data to acquire the optimal error detection result of the function module.

The input data selector 1020-3 may select data necessary for identifying a situation from among data acquired by the input data acquirer 1020-1 or data preprocessed by the input data preprocessor 1020-2. The selected data may be provided to the determiner 1020-4. The input data selector 1020-3 may select some or all of the acquired or preprocessed data according to preset selection criteria for identifying a situation. Also, the input data selector 1020-3 may select data according to a preset selection criterion by learning by the model learner 1010-4.

The model updater 1020-5 may control the artificial intelligence model to be updated based on the evaluation of the recognition result provided by the determiner 1020-4. For example, the model updater 1020-5 may provide the model learner 1010-4 with the image processing result provided by the determiner 1020-4, and thus may request the model learner 1010-4 to additionally train or update the artificial intelligence model.

Figure 12:
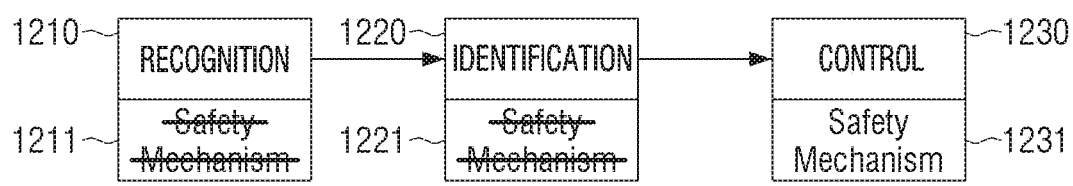
FIG. 12 is a diagram illustrating stopping an application of a previously applied safety mechanism according to an embodiment of the disclosure.

FIG. 12 is a diagram illustrating stopping an application of a previously applied safety mechanism according to the embodiment of the disclosure.

Referring to FIG. 12, the operations of the recognition modules 1210, the identification module 1220, and the control module 1230, and the safety mechanisms 1211, 1221, and 1231 applied to the recognition module 1210, the identification module 1220, and the control module 1230, respectively, depend on the safety integrity level, which may be the same as those shown in FIG. 7.

Meanwhile, the electronic apparatus may omit detecting the error operation of the function module when the performance of the function module is very high or when the real-time property is required. The high performance of the function module may mean that the error operation probability of the function module is low. In detail, when the failure probability of the function module is very low and there is no damage even in the case of malfunction, the electronic apparatus may stop the application of the safety mechanism to the function module and immediately deliver the output value to the next function module. A very low probability of failure of the function module may mean that as a result of applying the safety mechanism to the function module for a predetermined time or number of times, the function module may be in a normal range, and show no suspicious tendency as malfunction.

Although the artificial intelligence model is not shown in FIG. 12, the operation of stopping the application of the safety mechanism to each function module may be performed for each function module by the artificial intelligence model.

Even when the application of the safety mechanism to the function module is stopped, when the preset time or the preset number of times of operation of the function module is exceeded, the electronic apparatus may apply the safety mechanism again.

As such, by not applying a safety mechanism to a function module whose safety is guaranteed, time and resources required to perform a function can be reduced.

Figure 13:
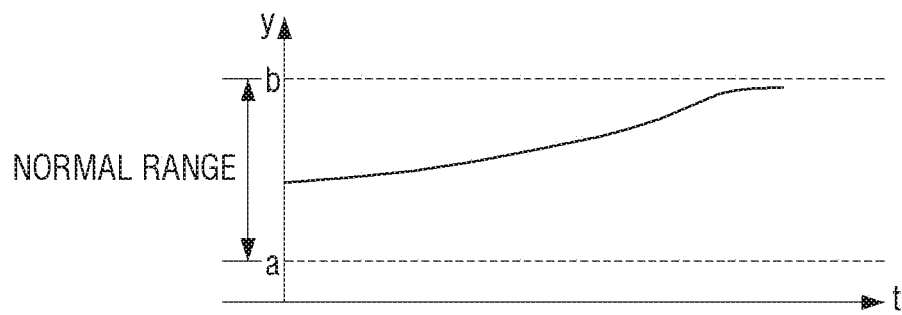
FIG. 13 is a diagram illustrating requiring an additional safety mechanism according to an embodiment of the disclosure.
Figure 14:
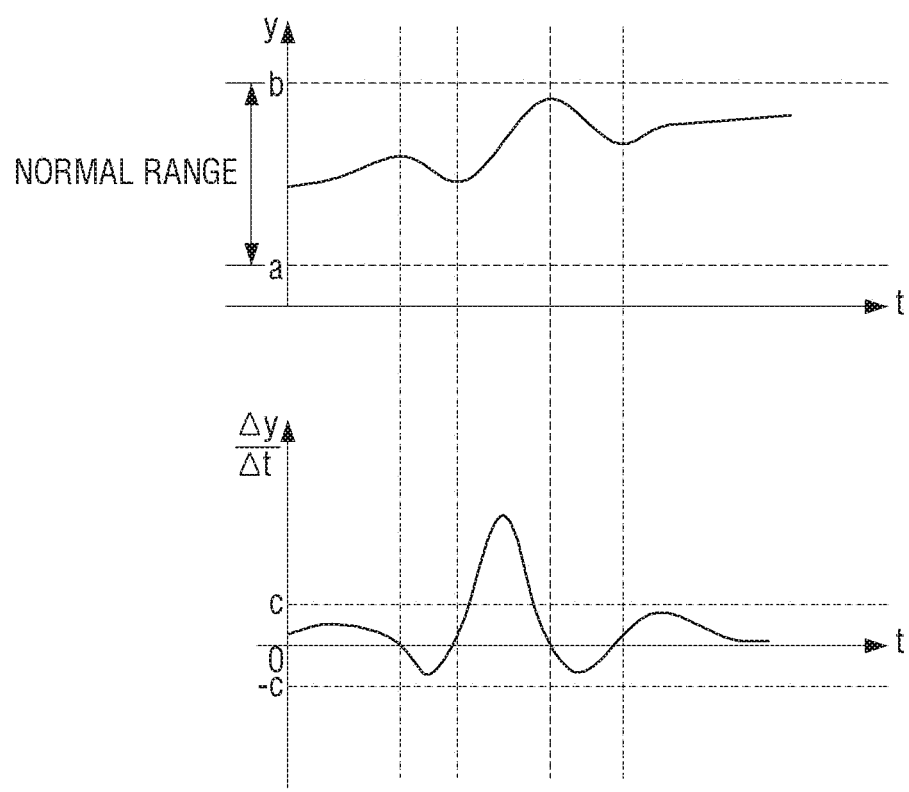
FIG. 14 is a diagram illustrating requiring an additional safety mechanism according to an embodiment of the disclosure.

FIGS. 13 and 14 are diagrams illustrating requiring an additional safety mechanism according to various embodiments of the disclosure.

Referring to FIGS. 13 and 14, an embodiment in which a malfunction is suspected even when it is identified that the function module is in a normal operation when a safety mechanism is applied to a function module is illustrated. For example, FIGS. 13 and 14 exemplarily illustrate a case where the safety mechanism 1a is applied to a function module.

Examples of the case where the malfunction of the function module is suspected may include the case where the number of input values and the number of output values are different, the case where the output value to the input value tends to be close to the boundary of the normal range as shown in FIG. 13, or the case where the amount of change in the output value to the input value exceeds a preset value as shown in FIG. 14.

Referring to FIG. 13, when the safety mechanism 1a is applied, when the normal range of the output value to the input value is between a and b, the range of the output value is between a and b, so it may be identified that the function module is normally operated.

However, according to an embodiment of the disclosure, even when the output value is within the normal range, when the output value to the similar input value tends to be getting closer to the boundary of the normal range, the electronic apparatus may suspect the malfunction of the function module. For example, in an ASCC system of ADAS of a vehicle, if the recognition module recognizes an object included in an image as a vehicle, when the recognition accuracy is within the normal range but gets closer to the boundary value, the electronic apparatus may suspect the malfunction of the recognition module and apply the additional safety mechanism.

Referring to FIG. 14, when the amount of change in an output value to a similar input value is greater than or equal to a preset value, the electronic apparatus may suspect the malfunction of the function module. Specifically, it may be identified whether the accuracy of the recognition fluctuates within the normal range based on the amount of change $\Delta y/\Delta t$ of the accuracy over time. For example, as shown in FIG. 14, when the size of the reference value of the amount of change in accuracy is c, if the amount of change in accuracy is greater than c or less than −c, the electronic apparatus may suspect the malfunction of the recognition module. In another embodiment, if the average of the amount of change in accuracy within a specific time range is greater than c or less than −c, the electronic apparatus may suspect the malfunction of the recognition module.

According to one embodiment, in the ASCC system of ADAS of a vehicle, if the recognition module recognizes an object included in an image as a vehicle, when the amount of change is greater than the preset value even when the recognition accuracy is within the normal range, the electronic apparatus may suspect the malfunction of the recognition module and apply the additional safety mechanism.

Figure 15:
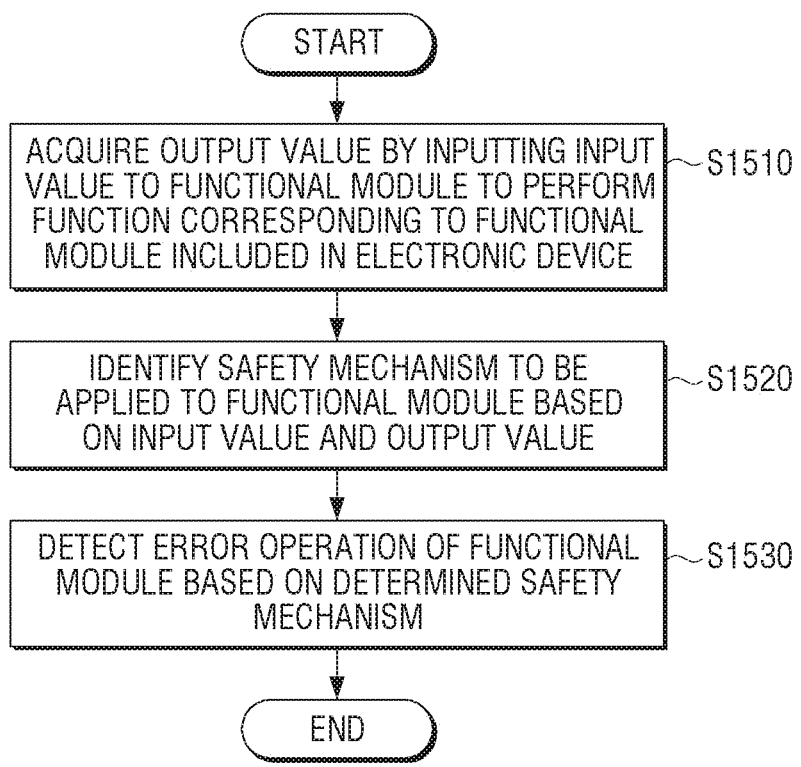
FIG. 15 is a flowchart illustrating a method for controlling an electronic apparatus according to an embodiment of the disclosure.

FIG. 15 is a flow chart illustrating a method for controlling an electronic apparatus according to an embodiment of the disclosure.

Referring to FIG. 15, first, the electronic apparatus may acquire the output value by inputting the input value to the function module to perform the function corresponding to the function module included in the electronic apparatus at operation S1510. In this case, the input value input to the function module may be at least one of a sensing value obtained by the sensor, information received from an external device, and an output value output from the previous function module.

Next, the electronic apparatus may identify the safety mechanism to be applied to the function module based on the input value and the output value at operation S1520. In detail, the electronic apparatus may identify a safety mechanism to be additionally applied to the previously applied safety mechanism based on the safety integrity level of the function module, or may identify a safety mechanism to be applied regardless of the safety integrity level. The operation of identifying the safety mechanism to which the function module is applied using the input value and the output value may be performed based on a condition preset by the processor, or may be performed by the trained artificial intelligence model.

Next, the electronic apparatus may detect the error operation of the function module based on the identified safety mechanism at operation S1530. In this case, according to the disclosure, the error operation not detected by the safety mechanism applied according to the safety integrity level of the existing function module may be detected by additionally applying the safety mechanism.

Figure 16:
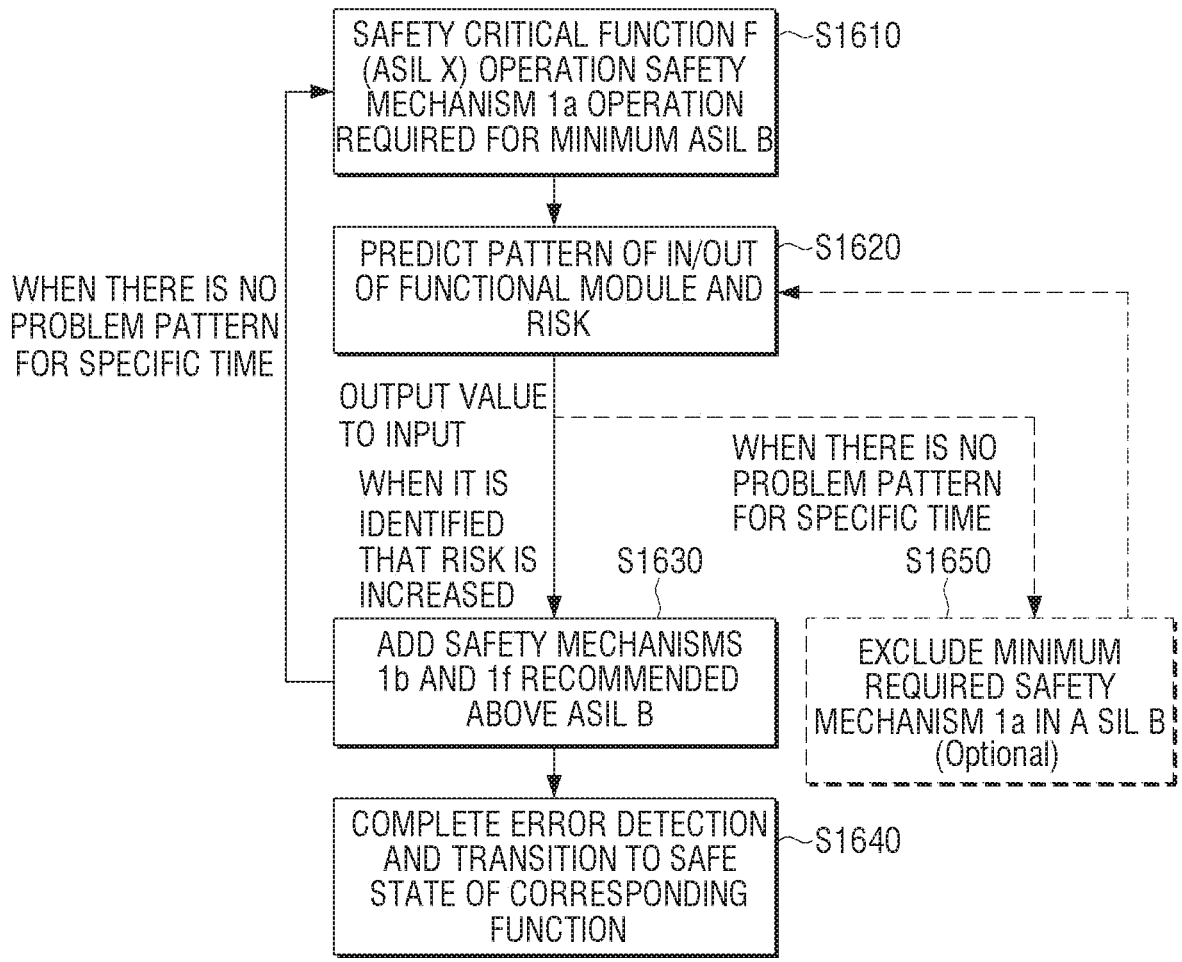
FIG. 16 is a flowchart illustrating in more detail the control method of FIG. 15 according to an embodiment of the disclosure.

FIG. 16 is a flowchart illustrating in more detail the control method of FIG. 15 according to an embodiment of the disclosure.

Referring to FIG. 16, first, the electronic apparatus may operate a function F which is a safety critical function that may threaten safety in the case of the malfunction at operation S1610. Herein, the operation of the function F may mean that the function module corresponding to the function F operates or the function F is performed by the chip. The function F may be of the ASIL B level, so the safety mechanism (1a) required for the ASIL B may operate.

The electronic apparatus may predict a pattern analysis and a risk of the input value and the output value of the function module at operation S1620. In detail, the electronic apparatus may predict the tendency of the output value to the input value and the risk that will occur when the corresponding function module malfunctions. Such an operation may be performed by a processor based on a preset condition, or may be performed by the trained artificial intelligence model.

Then, when the pattern of the output value to the input is analyzed, when the risk is identified to be high, the electronic apparatus may additionally apply the safety mechanisms 1b and 1f recommended in the ASIL B or higher at operation S1630. At this time, when the artificial intelligence model is included in the electronic apparatus, the artificial intelligence model may train the safety mechanism applied to the input value and the output value of the function module.

If an error is detected according to the application of the additional safety mechanism, the electronic apparatus may transition the electronic apparatus to the safe state at operation S1640. In detail, the electronic apparatus may transition the corresponding function module to the safe state. The safety state may be a state in which the supply of power is stopped to stop the operation of the electronic apparatus, or a state in which a function of detecting an error is limited. In this case, the electronic apparatus may notify the user of the information on the detected error through a display or a speaker. A user receiving the notification can manually operate the device or take safety measures for the corresponding function.

On the other hand, when the additional safety mechanism is applied, if a problem pattern is not found for a preset specific time, the process returns to operation S1610 to stop applying the additional safety mechanism and apply only the safety mechanism required at the safety integrity level.

On the other hand, if the problem pattern is not found for a preset specific time as a result of analyzing the patterns of the input value and the output value, the electronic apparatus may selectively exclude the safety mechanism 1a that is required at least in ASIL B at operation S1650. When the application of the safety mechanism 1a is stopped, the electronic apparatus may predict the risk by analyzing the patterns of the input value and the output value again after the preset time or when the function F is operated more than a predetermined number of times.

According to the disclosure described above, the error that cannot be detected by the existing safety mechanism can be detected by applying the additional safety mechanism, and thus can be dealt with more quickly.

Meanwhile, the diverse embodiments described above may be implemented in a computer or a computer-readable recording medium using software, hardware, or a combination of software and hardware. According to a hardware implementation, embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, embodiments described in the disclosure may be implemented by the processor itself. According to a software implementation, embodiments, such as procedures and functions described in the disclosure may be implemented by separate software modules. Each of the software modules may perform one or more functions and operations described in the disclosure.

Meanwhile, the methods according to various embodiments of the disclosure described above may be stored in a non-transitory readable medium. The non-transitory readable medium may be mounted and used in various apparatuses.

The non-transitory computer-readable medium is not a medium that stores data therein for a while, such as a register, a cache, a memory, or the like, but means a medium that semi-permanently stores data therein and is readable by an apparatus. In detail, programs for performing the diverse methods described above may be stored and provided in the non-transitory readable medium, such as a compact disc (CD), a digital versatile disc (DVD), a hard disc, a Blu-ray disc, a universal serial bus (USB), a memory card, a read only memory (ROM), or the like.

According to an embodiment, the methods according to the diverse embodiments disclosed in the document may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In a case of the online distribution, at least portions of the computer program product may be at least temporarily stored in a storage medium, such as a memory of a server of a manufacturer, a server of an application store, or a relay server or be temporarily created.

While the disclosure has been shown and described with reference to various embodiments thereof, it will be understood by those skilled in the art the various changes in form and details may be made therein without departing from the spirit and scope of the disclosure as defined by the appended claims and their equivalents.

What is claimed is:

1. A method for controlling an electronic apparatus, the method comprising:
    acquiring an output value by inputting an input value to a function module to perform a function corresponding to the function module included in the electronic apparatus;
    identifying at least one safety mechanism to be applied to the function module based on the output value and a safety integrity level of the function module; and
    detecting an error operation of the function module based on the identified at least one safety mechanism,
    wherein the identifying further comprises identifying a first safety mechanism and a second safety mechanism, the second safety mechanism being different from the first safety mechanism, in response to an error operation of the function module not being detected based on the first safety mechanism, and the output value satisfying a preset condition.

2. The method of claim 1, wherein the identifying further comprises:
    identifying the first safety mechanism based on a safety integrity level of the function module.

3. The method of claim 2, wherein the preset condition comprises at least one of a case where a number of times of input of the input value and a number of times of output of the output value are different, a case where a difference between the output value to the input value and a boundary of a normal range decreases over time, or a case where an amount of change in the output value to the input value exceeds a preset value.

4. The method of claim 2, wherein the identifying of the first safety mechanism comprises identifying the first safety mechanism based on a priority of a plurality of safety mechanisms according to the safety integrity level, the priority being pre-stored in the electronic apparatus.

5. The method of claim 1, wherein the identifying of the at least one safety mechanism comprises, in response to the input value and the output value being within a normal range based on a previously applied safety mechanism according to a safety integrity level of the function module, and the output value not satisfying a preset condition, stopping an operation corresponding to the previously applied safety mechanism to the function module.

6. The method of claim 1, wherein the input value comprises at least one of a value acquired by a sensor, a value received from an external device, or an output value of a previous function module.

7. The method of claim 1, further comprising:
    transitioning the electronic apparatus to a safe state in response to the error operation of the function module being detected.

8. The method of claim 1, wherein the function module comprises one of a recognition module, an identification module, or a control module.

9. An electronic apparatus comprising:
    a memory configured to store at least one instruction; and
    a processor,
    wherein the processor is configured to:
        acquire an output value by inputting an input value to a function module to perform a function corresponding to the function module included in the electronic apparatus,
        identify at least one safety mechanism to be applied to the function module based on the output value and a safety integrity level of the function module, and
        detect an error operation of the function module based on the identified at least one safety mechanism,
        wherein the identifying further comprises identifying a first safety mechanism and a second safety mechanism, the second safety mechanism being different from the first safety mechanism, in response to an error operation of the function module not being detected based on the first safety mechanism, and the output value satisfying a preset condition.

10. The electronic apparatus of claim 9, wherein the processor is further configured to:
    identify the first safety mechanism based on a safety integrity level of the function module.

11. The electronic apparatus of claim 10, wherein the preset condition is at least one of a case where a number of times of input of the input value and a number of times of output of the output value are different, a case where a difference between the output value to the input value and a boundary of a normal range decreases over time, or a case where an amount of change in the output value to the input value exceeds a preset value.

12. The electronic apparatus of claim 10, wherein the processor is further configured to identify the first safety mechanism based on a priority of a plurality of safety mechanisms according to the safety integrity level, the priority being pre-stored in the electronic apparatus.

13. The electronic apparatus of claim 9, wherein the processor is further configured to stop an operation corresponding to a previously applied safety mechanism to the function module in response to the input value and the output value being within a normal range based on the previously applied safety mechanism according to a safety integrity level of the function module, and the output value not satisfying a preset condition.

14. The electronic apparatus of claim 9, wherein the input value comprises at least one of a value acquired by a sensor, a value received from an external device, or an output value of a previous function module.

15. The electronic apparatus of claim 9, wherein the processor is further configured to transition the electronic apparatus to a safe state in response to an error operation of the function module being detected.

16. The electronic apparatus of claim 9, wherein the function module comprises one of a recognition module, an identification module, or a control module.

17. A non-transitory computer-readable recording medium including a program that when executed by at least one processor performs a method for controlling an electronic apparatus, the method for controlling the electronic apparatus comprising:
    acquiring an output value by inputting an input value to a function module to perform a function corresponding to the function module included in the electronic apparatus;
    identifying at least one safety mechanism to be applied to the function module based on the output value and a safety integrity level of the function module; and
    detecting an error operation of the function module based on the identified at least one safety mechanism, wherein the identifying further comprises identifying a first safety mechanism and a second safety mechanism, the second safety mechanism being different from the first safety mechanism, in response to an error operation of the function module not being detected based on the first safety mechanism, and the output value satisfying a preset condition.

18. The non-transitory computer-readable recording medium of claim 17, wherein the identified safety mechanism is received from an external server.

19. The non-transitory computer-readable recording medium of claim 18, wherein the detecting of the error operation of the function module is performed by the external server based on transmitting the input value, the output value, and index information of the identified safety mechanism to the external server.

20. The non-transitory computer-readable recording medium of claim 18,
wherein the function module is one of a recognition module, an identification module, and or a control module,
wherein each of the recognition module, the identification module, and the control module is controlled by a trained neural network model, and
wherein the trained neural network model identifies an additional safety mechanism to be applied to other safety mechanisms according to a safety integrity level based on input values and output values of each function module.

* * * * *